(12) United States Patent
Kugler et al.

(10) Patent No.: US 9,738,246 B2
(45) Date of Patent: Aug. 22, 2017

(54) ADJUSTING DEVICE FOR A FRONT LID AND ASSOCIATED MOTOR VEHICLE

(71) Applicant: AUDI AG, Ingolstadt (DE)

(72) Inventors: Peter Kugler, Donauwörth (DE); Wolfgang Dorfner, Buxheim (DE); Harald Sternecker, Beilngries (DE); Bernhard-Konrad Pfaller, Denkendorf (DE); Manfred Schindler, Markt Schwaben (DE)

(73) Assignee: AUDI AG, Ingolstadt (DE)

( * ) Notice: Subject to any disclaimer, the term of this patent is extended or adjusted under 35 U.S.C. 154(b) by 435 days.

(21) Appl. No.: 14/518,236

(22) Filed: Oct. 20, 2014

(65) Prior Publication Data

US 2015/0108770 A1 Apr. 23, 2015

(30) Foreign Application Priority Data

Oct. 21, 2013 (DE) .................. 10 2013 017 457

(51) Int. Cl.
*B60R 21/38* (2011.01)

(52) U.S. Cl.
CPC ......... *B60R 21/38* (2013.01); *Y10T 292/1082* (2015.04)

(58) Field of Classification Search
CPC .................................................... B60R 21/38
See application file for complete search history.

(56) References Cited

U.S. PATENT DOCUMENTS

| 8,635,757 | B2 | | 1/2014 | Bartsch et al. | |
|---|---|---|---|---|---|
| 9,566,941 | B2 | * | 2/2017 | Kugler | .................... B60R 21/38 |
| 2003/0020284 | A1 | | 1/2003 | Peter | |
| 2005/0082873 | A1 | * | 4/2005 | Takehara | ............. B62D 25/105 |
| | | | | | 296/187.09 |
| 2009/0108638 | A1 | * | 4/2009 | Wegener | .................... B60J 7/20 |
| | | | | | 296/224 |
| 2012/0144646 | A1 | | 6/2012 | Bartsch et al. | |
| 2015/0060180 | A1 | * | 3/2015 | Yang | ....................... B60R 21/38 |
| | | | | | 180/274 |
| 2015/0107929 | A1 | * | 4/2015 | Kugler | .................... E05F 15/63 |
| | | | | | 180/274 |

(Continued)

FOREIGN PATENT DOCUMENTS

| DE | 201 06 478 | | 11/2001 | |
|---|---|---|---|---|
| DE | 102006002827 B3 | * | 9/2007 | ............. B60J 7/205 |
| DE | 102006010801 A1 | * | 9/2007 | ............. B60R 21/38 |

(Continued)

OTHER PUBLICATIONS

European Search Report with respect to counterpart European patent application EP 14 00 2921.

(Continued)

*Primary Examiner* — Nicole Verley

(74) *Attorney, Agent, or Firm* — Henry M. Feiereisen LLC

(57) ABSTRACT

Adjusting device for a front lid, with an actuator for raising the rear edge of the front lid, wherein the actuator is configured as a coupling mechanism having a first drive with a rotation-locked lever connected to a push rod in an articulated fashion and a second drive with a rotation-locked lever connected to a push rod in an articulated fashion, wherein the two push rods have a common attachment point, via which they are connected to the front lid.

10 Claims, 6 Drawing Sheets

(56) References Cited

U.S. PATENT DOCUMENTS

2016/0272146 A1* 9/2016 Hwang .................. E05D 11/00

FOREIGN PATENT DOCUMENTS

| | | | | |
|---|---|---|---|---|
| DE | EP 1882617 A2 * | 1/2008 | ............. | B60R 21/38 |
| DE | 102006042498 | 3/2008 | | |
| DE | 102008046145 A1 * | 3/2010 | ............. | B60R 21/38 |
| DE | 102008058186 A1 * | 5/2010 | ............. | B60R 21/38 |
| DE | 102009006451 A1 * | 7/2010 | ............. | B60R 21/38 |
| DE | 102009040417 A1 * | 3/2011 | ............. | B60R 21/38 |
| DE | 10323118 B4 * | 7/2011 | ............. | B60R 21/38 |
| DE | 102005033609 B4 * | 2/2013 | ............. | B60J 7/198 |
| DE | 10331047 B4 * | 10/2015 | ............. | B60R 21/38 |
| DE | WO 2016162317 A1 * | 10/2016 | ............. | B60R 21/38 |
| DE | 102015010395 B3 * | 11/2016 | ............. | B60R 21/38 |
| FR | 2935732 A1 * | 3/2010 | ............. | B60R 21/38 |
| JP | 2009 090 908 | 4/2009 | | |
| JP | 5239285 B2 * | 7/2013 | | |
| JP | WO 2016021326 A1 * | 2/2016 | ............. | B62D 25/10 |

OTHER PUBLICATIONS

Translation of European Search Report with respect to counterpart European patent application EP 14 00 2921.

* cited by examiner

ADJUSTING DEVICE FOR A FRONT LID AND ASSOCIATED MOTOR VEHICLE

CROSS-REFERENCES TO RELATED APPLICATIONS

This application claims the priority of German Patent Application, Serial No. 10 2013 017 457.0, filed Oct. 21, 2013, pursuant to 35 U.S.C. 119(a)-(d), the content of which is incorporated herein by reference in its entirety as if fully set forth herein.

BACKGROUND OF THE INVENTION

The present invention relates to an adjusting device for a front lid with an actuator for raise the rear edge of the front lid.

It is known to provide a drive for front lids of motor vehicles to allow adjustment of the front lid in certain situations. For the protection of pedestrians, a front lid can be actively raised after detecting an impact, so that a portion of the impact energy can be absorbed by deforming the front lid. Such active front lids are usually moved vertically upwards and also horizontally rearward. However, unless the lid is raised, sufficient deformation space is in most cases not available due to the rigid support structure of the vehicle.

It would therefore be desirable and advantageous to obviate prior art shortcomings and to provide an improved adjusting device that provides enhanced adjustment possibilities.

SUMMARY OF THE INVENTION

According to one aspect of the present invention, an adjusting device for a front lid has an actuator for raising a rear edge of the front lid, wherein the actuator includes a coupling mechanism composed of a first drive having a non-rotatable lever connected to a first push rod in an articulated fashion and a second drive having a rotation-locked lever connected to a second push rod in an articulated fashion. The first and second push rods are connected with one another at a common attachment point which is in turn connected to the front lid.

The adjusting device according to the invention thus includes two separately controllable drives, which are each connected to a multi-articulated joint, wherein both joints are connected with each other and also with the front lid. In this way, a kinematics is formed, which provides the required adjustment possibilities for the desired adjustment of the front lid. The two drives are therefore rotary drives, with which the two levers and the two push rods can be moved in a coordinated fashion, so that the desired positions of the front lid can be attained.

According to an advantageous feature of the present invention, the first and second drives of the adjusting device according to the invention may include an electric motor, wherein the electric motor may advantageously include an associated reduction gear. By selecting a sufficiently high rotation speed, the front lid can be adjusted with the adjusting device according to the invention in an extremely short period of time. Typically, only a fraction of a second is required for attaining a specific position.

In the adjusting device according to the invention, the common attachment point of the two push rods may advantageously be connected to a leg attachable to or attached to the front lid. Accordingly, the common attachment point of the two push rods has a support point on the leg which is in turn attachable to or attached to the front lid. In this way, the adjusting device according to the invention can be constructed as a modular, pre-assembled unit that can be readily installed in the engine compartment of a motor vehicle.

According to another advantageous feature of the present invention, the adjusting device according to the invention may include a control device, or may be connectable or connected to a control device, which is configured to control the first and the second drive in a coordinated fashion. Due to the kinematic coupling between the two drives, it is important that both drives are synchronously controlled in order to avoid constraining forces.

According to another advantageous feature of the present invention, the control device of the adjusting device according to the invention may be configured to control the actuators so that the front lid can be moved to a raised and horizontally rearward shifted pedestrian protection position or to an even further raised and even further horizontally rearward shifted type damage position. By moving the front lid to the pedestrian safety position, a free space is created underneath the front lid, which is available as deformation space in the event of an impact of a pedestrian. Accordingly, an impact of a pedestrian, in particular a head impact, on a hard structure can thus be avoided. Accordingly, the risk of serious injury can be significantly reduced with the adjusting device according to the invention.

In the so-called type damage position, the front lid may advantageously be raised even further and moved even further rearward, towards the rear of the vehicle. When the front lid is in the type damage position, the risk of damage to the front lid is reduced.

In another embodiment according to the invention, the control device may advantageously be adapted to control the drives so that the front lid can be moved to a service position where the rear end of the front lid is supported in an abutment that is fixed in relation to the vehicle body. In this embodiment, the front lid can be pivoted into the service position with the adjusting device according to the invention, without the need for additional components.

In addition, the invention relates to a motor vehicle. The motor vehicle according to the invention is characterized in that it has at least one adjusting device of the aforedescribed type, preferably two adjusting devices arranged at opposite sides of the engine compartment.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
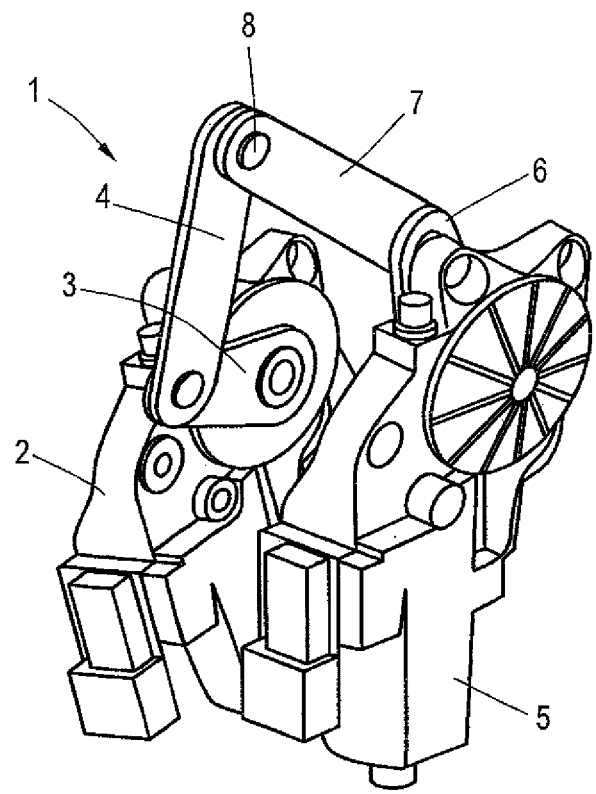
FIG. 1 shows a perspective view of an embodiment of an adjusting device according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown an adjusting device 1 in a perspective view. The adjusting device 1 includes an actuator which is formed as a coupling mechanism having a first drive 2 with a rotation-locked lever 3 connected to a push rod 4 in an articulated fashion. In addition, the adjusting device 1 includes a second drive 5 with a rotation-locked lever 6 connected to a push rod 7 in an articulated fashion.

Figure 11:
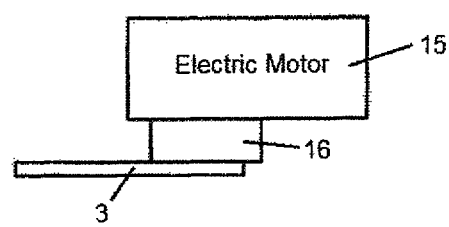
FIG. 11 shows a schematic illustration of an exemplary drive.

FIG. 1 shows that the two push rods 4, 7 have a common attachment point 8 at which they are connected to each other by a bolt. In the illustrated exemplary embodiment, the two drives 2, 5 are constructed substantially identically. Each drive 2, 5 includes, as indicated in FIG. 11, an electric motor 15 with an associated reduction gear 16. Accordingly, the two levers 3, 6 which are non-rotatably connected to the respective drive are rotated at a reduced speed with respect to the motor speed.

Figure 2:
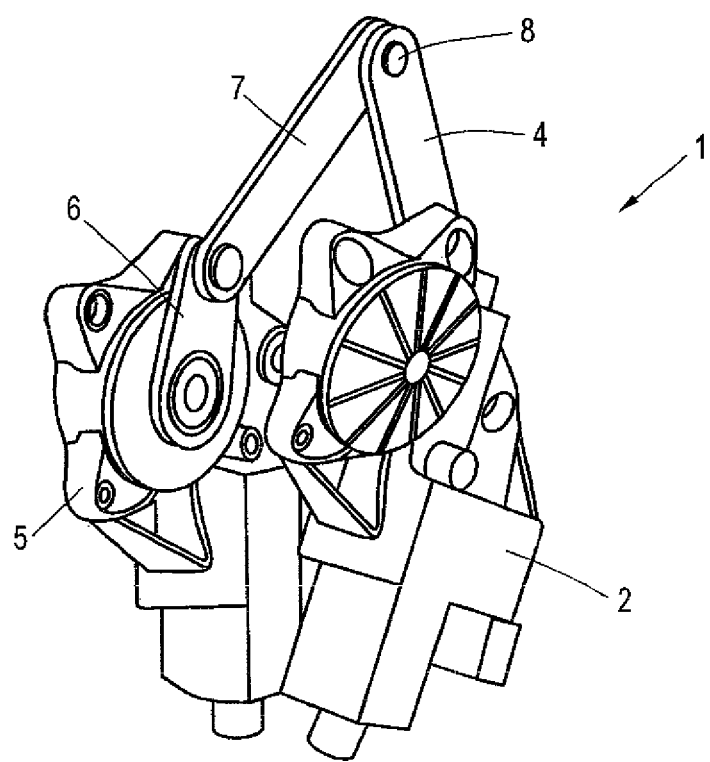
FIG. 2 shows the rear side of the adjusting device shown in FIG. 1.

FIG. 2 shows the adjusting device 1 from the opposite side, so that the drive 2 is located in front of the drive 5. The two drives 2, 5 are slightly inclined to one another with respect to their longitudinal axes, which is due to the installation situation.

Figure 3:
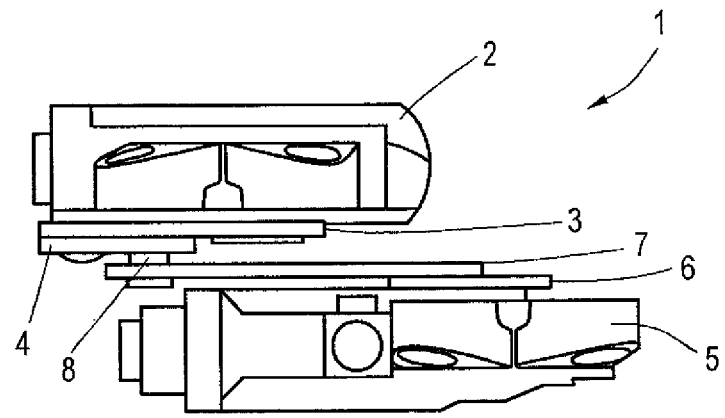
FIG. 3 is a plan view of the adjusting device of FIG. 1.

The plan view of. FIG. 3 shows that the two drives 2, 5 are arranged mutually parallel. Accordingly, the levers 3, 6 and the push rods 4, 7 are also arranged mutually parallel. The two levers and the two push rods therefore move substantially along a plane. The attachment point 8, which also serves as the connection to the front lid, can thus be moved by the adjusting device 1 along a plane. In a motor vehicle, two such adjusting devices 1 are mounted on opposite sides of the engine compartment, such that the attachment points 8 of the two adjusting devices are located on opposite sides near the rear end of the front lid.

Figure 4:
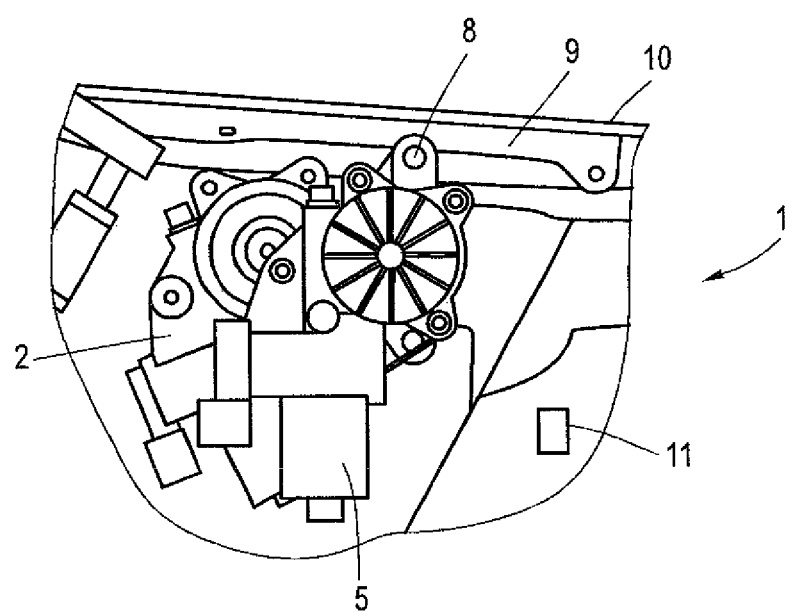
FIG. 4 shows the adjusting device mounted in a motor vehicle in a retracted position.
Figure 12:
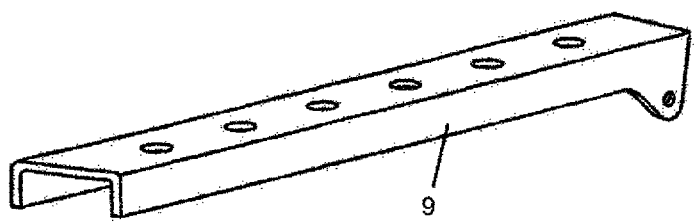
FIG. 12 shows a perspective illustration of a U-shaped leg.

FIG. 4 is a side view showing the adjusting device 1 which is arranged in the engine compartment of a motor vehicle. It is evident from FIG. 4 that the attachment point 8 and/or the bolt located at this point is connected to a leg 9 in an articulated fashion. The leg 9 has essentially a U-shaped profile as shown in FIG. 12. In the installed state, the leg 9 is connected to the front lid 10, which is only schematically shown in FIG. 4.

The adjusting device 1 also includes a schematically illustrated control device 11, which is configured to control of the two drives 2, 5 in a coordinated fashion. Due to the coupling of the two push rods 4, 7, the drives 2, 5 must be controlled in a coordinated fashion to avoid constraining forces.

FIG. 4 shows the adjusting device 1 in the normal position where the front lid 10 is closed.

Figure 7:
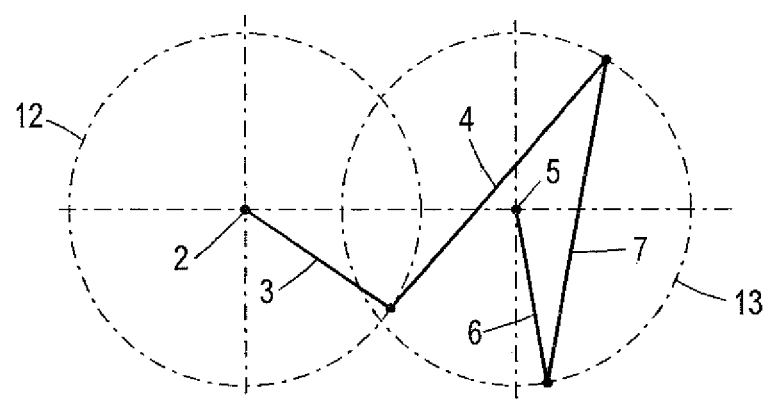
FIG. 7 shows a diagram of the kinematics in the retracted position.

FIG. 7 shows the corresponding kinematics. Particularly evident are the positions of the levers 3, 6 as well as the positions of the push rods 4, 7. Also shown is a circle 12, 13 for each drive 2, 5 which indicates the path of movement of the rotatable levers 3, 6.

As can be seen in FIG. 7, in the initial position the lever 3 and the push rod 4 of the drive 2 are arranged approximately perpendicular to each other, whereas the lever 6 and the push rod 7 of the second actuator 5 enclose an acute angle.

Figure 5:
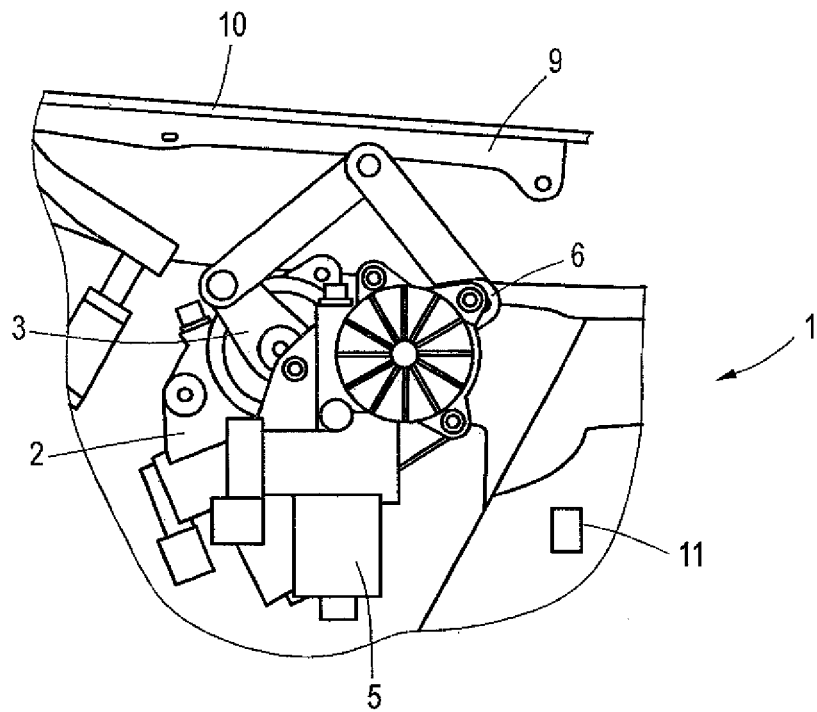
FIG. 5 shows the adjusting device in the pedestrian protection position.

FIG. 5 shows the adjusting device 1 after it has been moved from the position shown in FIG. 4 to the so-called pedestrian protection position. To this end, the levers 3, 6 in the view of FIG. 5 were rotated counterclockwise. As a result, the leg 9 and accordingly also the front lid 10 were moved both vertically upwards and horizontally rearward, i.e. in the view of FIG. 5 to the left. In this pedestrian protection position, a free space is located underneath the front lid 10, which serves as a deformation space in the event of an impact with a pedestrian, so that a large portion of the kinetic energy can be absorbed through deformation of the front lid 10, so that less serious injuries to the pedestrian can be expected.

Figure 8:
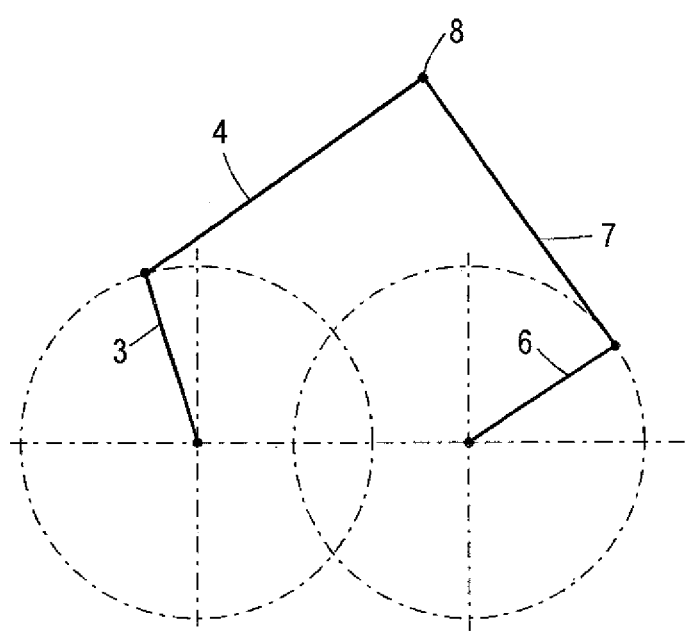
FIG. 8 shows a diagram of the kinematics in pedestrian protection position.

It is evident from the associated kinematic representation of FIG. 8 that the lever 3 and the push rod 4, which operates like a connecting rod, form an angle which is somewhat greater than a right angle. Similarly, the lever 6 also forms with the push rod 7 approximately a right angle. It is also evident that the two push rods 4, 7 contacting each other at the attachment point 8 assume approximately a right angle relative to each other. While the control device 11 controls the two drives 2, 5, the front lid 10 can be moved from the initial position shown in FIG. 7 into the pedestrian protection position shown in FIG. 8 in less than half a second.

Figure 6:
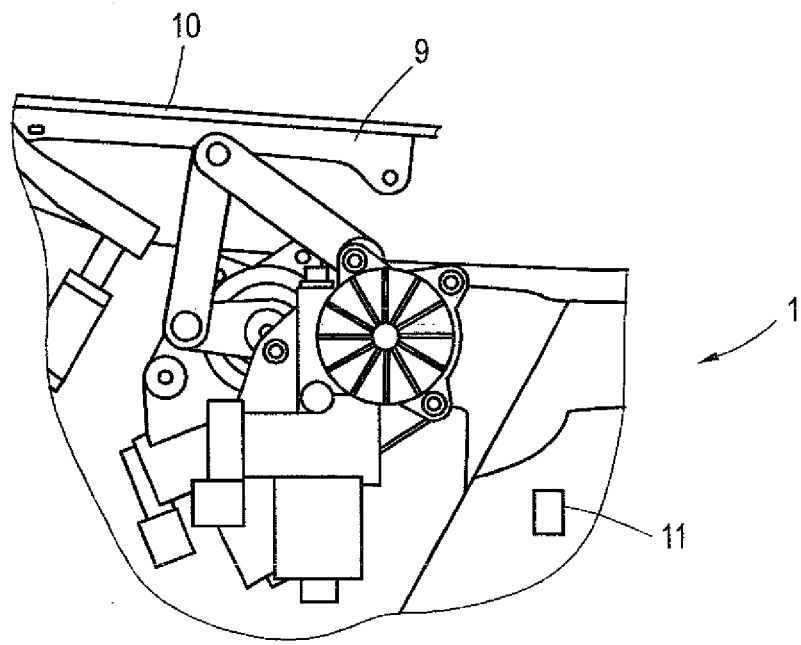
FIG. 6 shows the adjusting device in the type damage position.

FIG. 6 shows the adjusting device 1 after it has been moved from the retracted position shown in FIG. 4 or from the pedestrian protection position shown in FIG. 5 to a so-called type damage position. In this type damage position, the leg 9 is shifted farther to the rear compared to the pedestrian protection position, i.e. to the left in the view of FIG. 6. The vertical position corresponds substantially to that of the pedestrian protection position shown in FIG. 5. In this position, the front edge of the front lid 10 is moved even farther rearward, thereby reducing the risk of damage.

Figure 9:
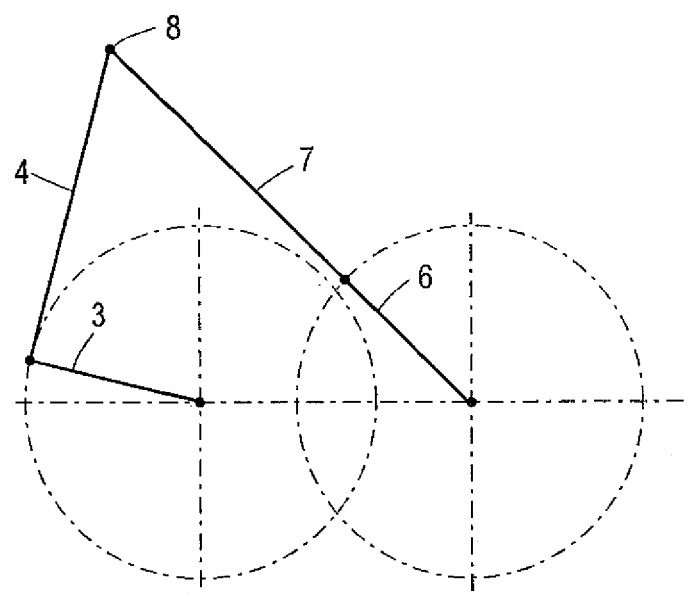
FIG. 9 shows a diagram of the kinematics in the type damage position.

As can be seen in the associated kinematic diagram of FIG. 9, the lever 6 and the push rod 7 are "stretched", i.e. the attachment point 8 is located as far away from the axis of rotation as possible. The lever 3 and the push rod 4 form approximately a right angle relative to each other. If environment sensors detect that an anticipated collision failed to materialize, then the front lid 10 can be moved again with the drives 2, 6 from the position shown in FIG. 9 back to the pedestrian protection position shown in FIG. 5 and still further to the initial position shown in FIG. 4, which is controlled by the control device 11.

Figure 10:
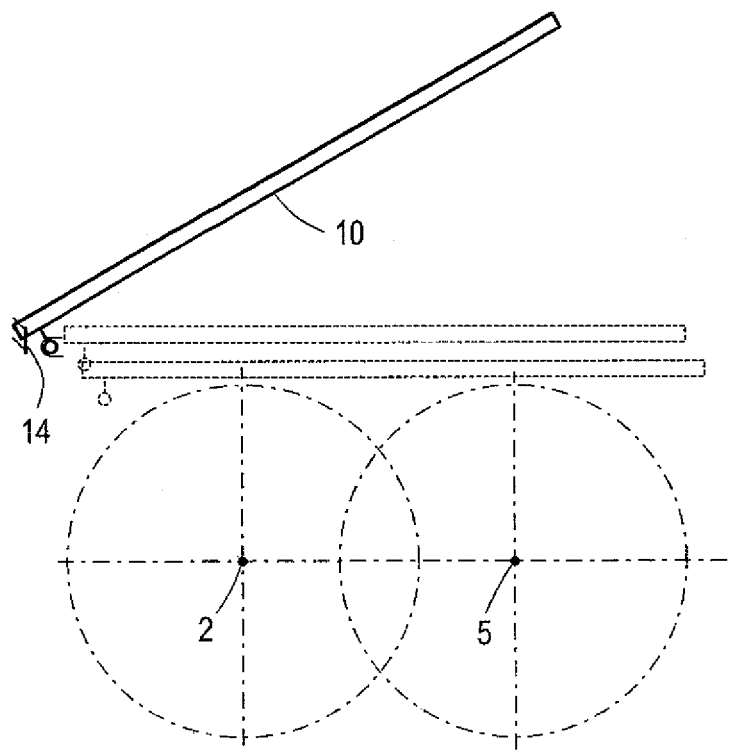
FIG. 10 shows a diagram of the kinematics when the front lid in a service position.

FIG. 10 shows that the front lid 10 can be raised by the drives 2, 5, and pushed into an abutment 14 disposed on the front lid. To this end, the front lid 10 is both raised and moved rearward (in the view of FIG. 10 to the left) by the drives 2, 5. When this tilted position is reached, a lock on the front lid 10 is released, and the front lid 10 is then pivoted by the drives 2, 5 into the service position shown by dashed lines. In this open position of the front lid 10, the engine compartment is accessible for maintenance or repair work.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. An adjusting device for a front lid, with an actuator for raising a rear edge of the front lid, the actuator comprising:
    a coupling mechanism comprising a first drive having a rotation-locked lever connected to a first push rod in an articulated fashion and a second drive having a rotation-locked lever connected to a second push rod in an articulated fashion, wherein the first and second push rods are connected with one another at a common attachment point which is in turn connected to the front lid.

2. The adjusting device of claim 1, wherein the first and the second drive comprise an electric motor.

3. The adjusting device of claim 2, wherein the electric motor comprises a reduction gear.

4. The adjusting device of claim 1, further comprising a leg attached to the front lid, wherein the common attachment point of the first and second push rods is connected to the leg.

5. The adjusting device of claim 4, wherein the leg is constructed as a U-shaped profile.

6. The adjusting device of claim 1, further comprising a control device configured to control the first and the second drive in a coordinated fashion.

7. The adjusting device of claim 6, wherein the control device is configured to control the first and the second drive so as to move the front lid to a raised and horizontally rearward displaced pedestrian protection position or to an even further raised and even further horizontally rearward displaced type damage position.

8. The adjusting device of claim 6, wherein the control device is configured to control the first and the second drive so as to move the front lid to a service position where the rear end of the front lid is supported in an abutment that is fixed in relation to the vehicle body.

9. A motor vehicle comprising at least one adjusting device for a front lid, with an actuator for raising a rear edge of the front lid, the actuator comprising:
    a coupling mechanism comprising a first drive having a rotation-locked lever connected to a first push rod in an articulated fashion and a second drive having a rotation-locked lever connected to a second push rod in an articulated fashion, wherein the first and second push rods are connected with one another at a common attachment point which is in turn connected to the front lid.

10. The motor vehicle of claim 9, comprising two adjusting devices arranged at opposite sides of an engine compartment.

* * * * *